G. H. Horstmann,
Dust Pan,
No. 32,368. Patented May 21, 1861.
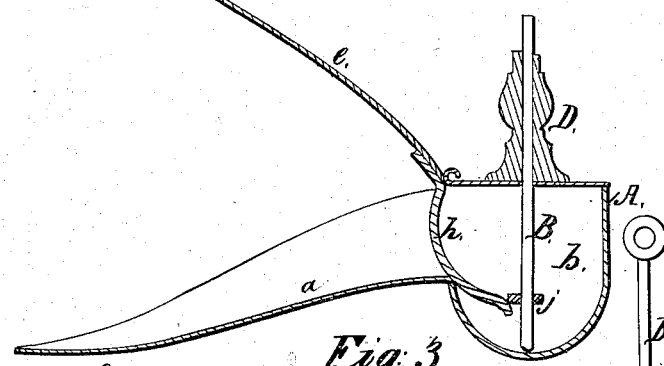
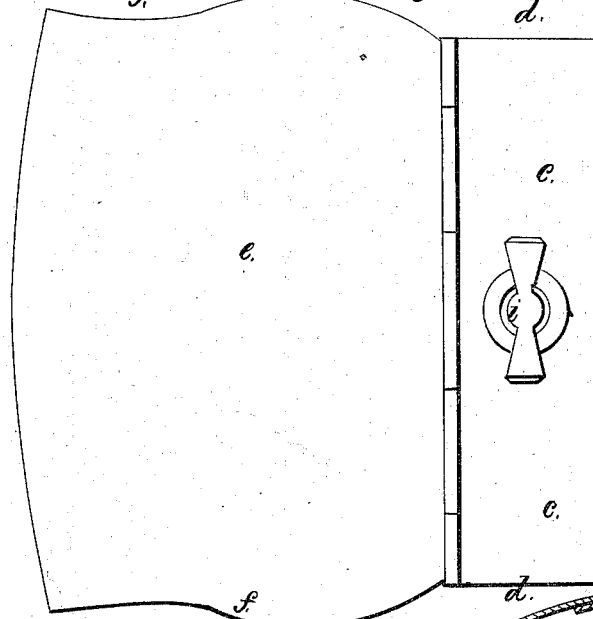
Witnesses:
Chas Houson
Chas. E. Foster
Inventor:
G. H. Horstmann
by H. Houson
Atty.

UNITED STATES PATENT OFFICE.

GEO. H. HORSTMANN, OF PHILADELPHIA, PENNSYLVANIA.

DUST-PAN.

Specification of Letters Patent No. 32,368, dated May 21, 1861.

*To all whom it may concern:*

Be it known that I, G. H. HORSTMANN, of Philadelphia, Pennsylvania, have invented a new and Improved Dust-Pan; and I do hereby declare the following to be a full, clear, and exact description of the same, reference being had to the accompanying drawing and to the letters of reference marked thereon.

My invention consists of a dust pan so formed and constructed, and combined with such appliances that it can be readily removed from place to place without the necessity of stooping on the part of the attendant, and without that escape of the dust and dirt from the pan, which is apt to occur in handling dust pans of the ordinary construction.

In order to enable others, to make and use my invention, I will now proceed to describe its construction and operation.

On reference to the accompanying drawing which forms a part of this specification—Figure 1 is a vertical section of my improved dust pan. Fig. 2 part of the same with the lid elevated, and Fig. 3 a ground plan.

Similar letters refer to similar parts throughout the several views.

A is the lower portion or body of my improved dust pan, and consists of the inclined tray $a$, and reservoir $b$, which is covered by a plate $c$, the ends $d$ of the reservoir being continued to the edge of tray and forming the side flanges $f$ $f$ of the same. To the front edge of the cover plate $c$, is hinged a lid $e$, which when down, rests on and fits closely to the flanges $f$ and to the outer edge of the tray, so as to form a complete cover for the latter. To the lid $e$, and near the point where it is hinged to the cover plate $c$, is secured a bent arm $h$, which projects into the reservoir $b$, and against which bears the lower end of the rod B, the latter fitting snugly in, being guided by, and arranged to move freely within the hollow vertical stem D, which is secured to the top of the plate $c$, the upper end of the rod being furnished with a suitable handle $i$.

The downward movement of the rod is limited by its lower end striking against the bottom of the reservoir $b$, and the upward movement is limited by the collar $j$ striking against the underside of the cover plate $c$. The arm $h$ is so bent and so situated in respect to the rod, that when the latter is raised as seen in Fig. 1, the lid $e$ will rest on the flanges $f$, and the outer edge of the tray, but on depressing the rod, its lower end, bearing on the end of the arm $h$, will move the latter so as to elevate the lid. After the lid has been fully raised, the downward movement of the rod is continued, its end sliding past the end of the arm, and finally resting on the bottom of the reservoir $b$. As long as the rod remains thus depressed, it serves to retain the lid in its elevated position, inasmuch as the end of the arm bears against the side of the collar $j$, as best observed on reference to Fig. 2.

It should be understood, that the hollow stem D, and its internal rod, are so high that the handle $i$ of the latter, can be reached without the necessity of stooping on the part of the attendant.

The pan A is placed on the floor, and the handle $i$, with the rod B, depressed so as to elevate the lid $e$, and retain it in its elevated position. The dust and dirt are then swept toward the inclined tray, up the same, and into the reservoir $b$.

When the pan has to be removed, the attendant grasps the handle $i$, and thereby raises the whole apparatus, in doing which the rod will be slid upward, within the hollow stem D, and the lid will consequently fall thereby inclosing the dust and dirt. After the pan has been again deposited on the floor, the lid is again elevated by the depression of the rod, and the sweeping is continued as before.

As the removal of the pan from one place to another is effected through the medium of the handle $i$, it will be evident that the lid must fall at the very commencement of such removal, and that the escape of dust which takes place in handling ordinary dust pans is avoided. Independently of this advantage, the exertion demanded by constantly stooping in using ordinary dust pans, is obviated by my improvement. Another important feature of my improved dust pan is, that it will stand in its proper position without assistance, and thus enable the attendant to use both hands in sweeping.

I claim as my invention and desire to secure by Letters Patent—

1. The pan A comprising the tray $a$, and reservoir $b$, when combined with such a stem, that the pan can be removed from place to place, without the necessity of stooping to the extent required in handling ordinary dust pans.

2. The pan A, formed and constructed substantially as described, its lid $e$, elevated stem D, and the devices herein described, or their equivalents for operating the said lid, in the manner and for the purpose herein specified.

In testimony whereof, I have signed my name to this specification, in the presence of two subscribing witnesses.

G. HENRY HORSTMANN.

Witnesses:
  HENRY HOWSON,
  JOHN WHITE.